L. CHEETHAM.
Assignor to G. Draper.
SPINDLE-BEARINGS FOR SPINNING-MACHINES.
No. 7,814. Reissued July 24, 1877.
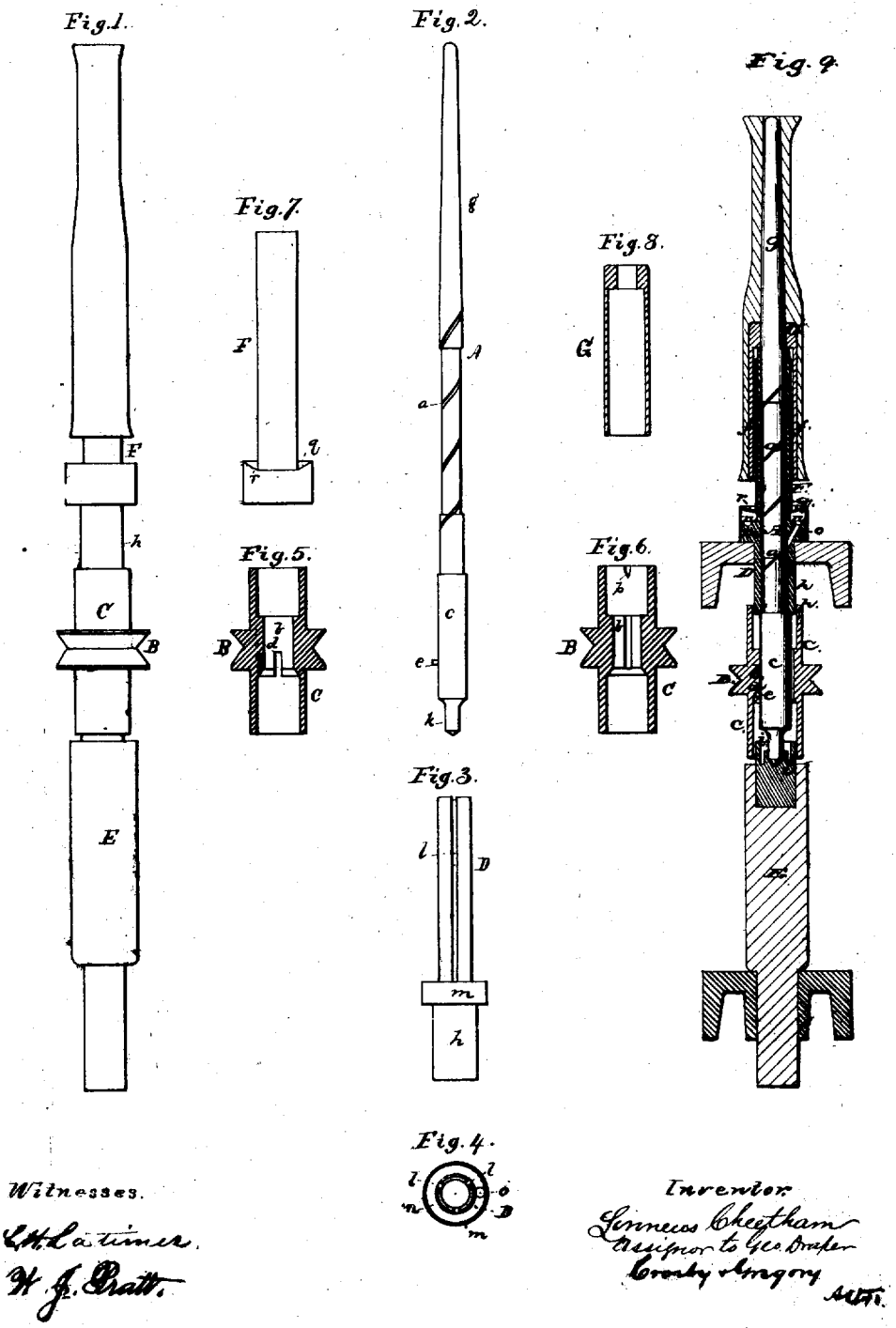
Witnesses.
C. H. Latimer.
W. J. Pratt.
Inventor.
Lemuel Cheetham
Assignor to Geo. Draper
Crosby & Gregory
Atty.

UNITED STATES PATENT OFFICE.

LINNEUS CHEETHAM, OF LEWISTON, ME., ASSIGNOR TO GEORGE DRAPER.

IMPROVEMENT IN SPINDLE-BEARINGS FOR SPINNING-MACHINES.

Specification forming part of Letters Patent No. 122,705, dated January 16, 1872; Reissue No. 7,814, dated July 24, 1877; application filed February 10, 1877.

*To all whom it may concern:*

Be it known that I, LINNEUS CHEETHAM, of Lewiston, in the county of Androscoggin and State of Maine, have invented certain new and useful Improvements in Machinery for Spinning, which are fully described in the following specification and delineated in the accompanying drawing, of which—

Figure 1 represents, in side elevation, the spindle with its step, whirl, bolster, and bobbin; Fig. 2, an elevation of the spindle itself; Fig. 3, an elevation; Fig. 4, a top view of the bolster; Figs. 5 and 6, longitudinal sections of the whirl and its sleeve, taken so as to show in one the locking-recess for a stud upon the spindle, and in the other an oil-passage; Fig. 7, a guard to surround to the bolster; Fig. 8, an auxiliary cap to protect the interior of the bobbin from access of oil; and Fig. 9, a sectional elevation of part of a spinning-frame, embracing in one view the various contrivances to be hereinafter more particularly described.

This invention is applicable to that class of spinning-machines among which those known as "ring-spinning machines" are the most important, and which are characterized by the following peculiarities of construction, viz:

First, the spindle is mounted on a stationary step, so as to have only a motion of rotation, and may therefore be termed a "stationary live-spindle."

Second, the bolster and its supporting-rail are fixed in position so that the length of that portion of the spindle which projects above its upper bearing remains constant.

Third, the spindle and bolster may be, and in practice usually are, so proportioned and arranged as to permit the bobbin to be brought down within a distance from the top of the bolster-rail much less than the length of the bobbin surface to be covered by the yarn-load.

The object of the principal improvements embraced in this invention is to enable the spindle to run at greater speed with less vibration of its bobbin and the yarn wound thereon than heretofore, and likewise to reduce the power required to drive it. These results are attained by chambering out the lower end of the bobbin while maintaining it in the same relative position, and by extending the bolster upward, so as to bring the upper bearing for the spindle nearer to the top of the load carried by it than would otherwise have been possible.

The other improvements have for their object the proper lubrication of the spindle and its bearings, and the protection of the bobbin from access of oil.

In the drawing, A represents the spindle, provided with a helical groove, *a*, extending around it. The whirl shown at B projects from a tube or sleeve, C, which is fitted by a socket, *b*, to the part *c* of the spindle, and is attached thereto by means of a slot, *d*, and stud *e*. The upper bearing or bolster *d* is shown extended upward into a chamber, *f*, within the bobbin, and above this chamber the bobbin is bored out lengthwise to receive and fit closely to and upon that part *g* of the spindle which extends above the bolster, or to certain portions of such part *g*, so that when the spindle is rotated it causes the bobbin to turn with it and to revolve around the stationary bolster.

The bolster is socketed into a supporting-rail, and is confined thereto by a clamp-screw acting against the tenon *h*. There should be room between the bottom of this rail and the top of the whirl-sleeve to enable the latter to be raised sufficiently for oil to be poured into the step *i*, by which the foot *k* of the spindle is supported. This step is shown mounted upon the top of a standard, E, which is supported by a rail below.

The bolster is formed with channels or grooves *l*, extending lengthwise in its outer surface from the top of it down to the base part *m*, which is provided with an annular channel or groove, *n*, and a passage, *o*, leading therefrom to the bore of the bolster.

There is also another oil-passage, *p*, extending into the sleeve of the whirl. Encompassing the bolster and its base is a tubular guard, F, provided at its lower part with an annular trough, *q*, out of which a hole, *r*, leads to and over the channel *n*. On pouring oil into the trough *q* it will flow therefrom through the hole *r* into the channel *n*, and thence through its outlet *o* into the bore of the bolster, and upon the spindle. While the spindle is rotating the oil will be elevated on it by the helical groove, and, passing up over the top of the bolster, will flow down in the grooves upon its outside, within the guard F, and thence into the channel *a* again. The oil will also find its way down through the whirl-sleeve into the step of the spindle-foot. In order, however, that the oil which circulates up through and down outside the bolster may not get upon the inner surface of the bobbin, an auxiliary tubular cap or sleeve, G, is placed on and over the guard F and the bolster D.

This construction renders it necessary to make the chamber of the bobbin of sufficient size to receive not only the extended bolster, but also its adjuncts, such as the guard and cap described, to enable the bobbin to revolve without contact or friction therewith or interruption therefrom. The bobbin is held on or to the spindle by close contact therewith at one or more places above the top of the bolster. In consequence of locating the bolster or upper bearing for the spindle within the bobbin, and thereby reducing the length of the unsupported portion of the spindle, it is made possible to dispense with much of that part of the spindle which usually extends below the whirl, and also to materially reduce the diameter of the spindle throughout its entire length, whereby its weight and the power required to drive it are considerably lessened, while its capacity is materially increased.

It will be seen, on reference to the drawing, that the bobbin therein delineated is what is termed a "quill-bobbin;" that its bore above the chamber in it conforms to a taper upon that portion of the spindle which extends above the bolster, and that when the bobbin is applied to the spindle it attaches itself thereto by the frictional adhesion of the surfaces brought in contact.

I am aware that it is not new in some forms of flier-frames to surround the spindle with a long tube, fitting to it closely and extending within the bobbin. But in all such cases either the spindle and bobbin have been driven at varying speeds, and have had a varying vertical position with relation to each other, or the outside of the long tube has been made to serve as a bearing for a flier, thereby consuming a great amount of power, limiting the capacity of the machine, and requiring a greater length of spindle and bolster between the bottom of the bobbin and the bolster-rail than the length of the bobbin surface covered with yarn.

I claim—

1. In a ring-spinning machine, the combination of a fixed bolster, a stationary live-spindle, and a chambered bobbin, constructed and adapted to co-operate substantially as described, whereby the bobbin, driven by the spindle encompasses the upper end of the bolster, and extends downward to within a distance from the top of the bolster-rail less than the length of its surface to be covered by the yarn-load.

2. In a ring-spinning machine, a spindle which is shorter above its upper bearing than the bobbin carried by it, and which is attached to the bobbin by the frictional adhesion of surfaces located entirely within a distance from the top of the bobbin less than the extreme length of the bobbin itself, substantially as described.

3. A quill-bobbin, chambered at its lower end to permit its use with an extended bolster, and provided above the chamber with an interior surface adapted to fit a taper upon the spindle, substantially as described.

4. The combination of a bobbin adapted to be driven by the spindle chambered at its lower end, a stationary bolster for the spindle located within it, and a tubular cap to protect the interior of the bobbin from access of oil, substantially as described.

5. A stationary bolster, having a bearing for the spindle above its supporting-rail, and provided with outside grooves and an interior passage for the flow of oil downward and into its bore, substantially as described.

6. In a ring-spinning machine, a bolster adapted to permit the flow of oil upward within it and downward outside of it, in combination with a tubular guard surrounding the bolster, substantially as and for the purpose specified.

LINNEUS CHEETHAM.

Witnesses:
NATHAN W. HARRIS,
W. H. WHITE.